United States Patent [19]

Kilbane et al.

[11] Patent Number: 4,640,978
[45] Date of Patent: Feb. 3, 1987

[54] FOAM-SEALED ELECTRICAL DEVICES AND METHOD AND COMPOSITION THEREFOR

[75] Inventors: George J. Kilbane, White Bear Lake; K. P. Subrahmanian, Woodbury, both of Minn.

[73] Assignee: Minnesota Mining and Manufacturing Company, Saint Paul, Minn.

[21] Appl. No.: 755,006

[22] Filed: Jul. 15, 1985

Related U.S. Application Data

[63] Continuation-in-part of Ser. No. 650,051, Sep. 13, 1984, abandoned.

[51] Int. Cl.$^4$ .................. H02G 3/04; C08G 18/14; C08G 18/10
[52] U.S. Cl. .................. 174/23 R; 174/88 R; 521/116; 521/117; 521/902; 521/137
[58] Field of Search .................. 521/902, 116, 117; 174/23 R, 88 R, 92

[56] References Cited

U.S. PATENT DOCUMENTS

| | | | |
|---|---|---|---|
| 2,979,485 | 4/1961 | Burkus | 260/75 |
| 2,993,877 | 7/1961 | D'Alelio | 260/45.5 |
| 3,054,755 | 9/1962 | Windemuth et al. | 260/2.5 |
| 3,073,802 | 1/1963 | Windemuth et al. | 260/77.5 |
| 3,097,191 | 7/1963 | France et al. | 260/77.5 |
| 3,245,922 | 4/1966 | Worsley et al. | 260/2.5 |
| 3,257,337 | 6/1966 | Schoepfle et al. | 260/2.5 |
| 3,378,399 | 4/1968 | Rambosek | 117/154 |
| 3,381,008 | 4/1968 | Steyermark | 260/248 |
| 3,635,848 | 1/1972 | Rambosek | 260/2.5 |
| 3,880,782 | 4/1975 | Rambosek | 260/2.5 |
| 3,902,006 | 8/1975 | Gouteron et al. | 174/88 R |
| 3,985,951 | 10/1976 | Harris | 174/138 F |
| 4,256,846 | 3/1981 | Ohashi et al. | 521/117 |
| 4,259,455 | 3/1981 | Hitchcock | 521/122 |
| 4,388,681 | 6/1983 | Meyer | 362/374 |
| 4,392,014 | 7/1983 | Trumble et al. | 174/92 |
| 4,401,491 | 8/1983 | Modic | 156/48 |
| 4,426,461 | 1/1984 | Smith | 521/116 |

FOREIGN PATENT DOCUMENTS 1053383  12/1966  United Kingdom .

OTHER PUBLICATIONS

Kirk—Othmer, *Encyclopedia of Chemical Technology*, Interscience Pub., N.Y., 2nd ed., vol. 12, pp. 46-47 (1967).
Sanders, J. H. et al., *Polyurethane Chemistry: Technology*, Part 1, Interscience Pub., N.Y., p. 94, (1962).
Sanders, J. H. et al., *Polyurethanes; Chemistry and Technology*, Part II, Interscience Pub., N.Y., pp. 260-261, (1964).
3M Product Bulletin 808 Maintenance and Rehabilitation Systems; Scotchcast ® Brand 4416 Cable Duct Sealing Kit.
Frisch, K. C. et al., *Plastic Foams*, Part II, Marcel Dekker, Inc., N.Y., pp. 487-489, (1973).
Material Safety Data Sheet For 15593—C PWO.

*Primary Examiner*—Herbert S. Cockeram
*Attorney, Agent, or Firm*—D. M. Sell; J. A. Smith; C. Truesdale

[57] ABSTRACT

A method of sealing electrical fittings is provided. The method comprises foaming in situ a removable, flame retardant, solvent resistant, substantially closed cell isocyanurate foam. The isocyanurate foam is prepared from a two-part, liquid, foamable, curable composition, the parts being mixed at the time of application, the composition comprising, in a first part, a prereaction product of an isocyanate and a polyol, and, in a second part, catalyst, chain extending agent, flame retardant agent, and blowing agent. Also provided are an electrical fitting and cable duct or riser sealed with the isocyanurate foam.

24 Claims, 4 Drawing Figures

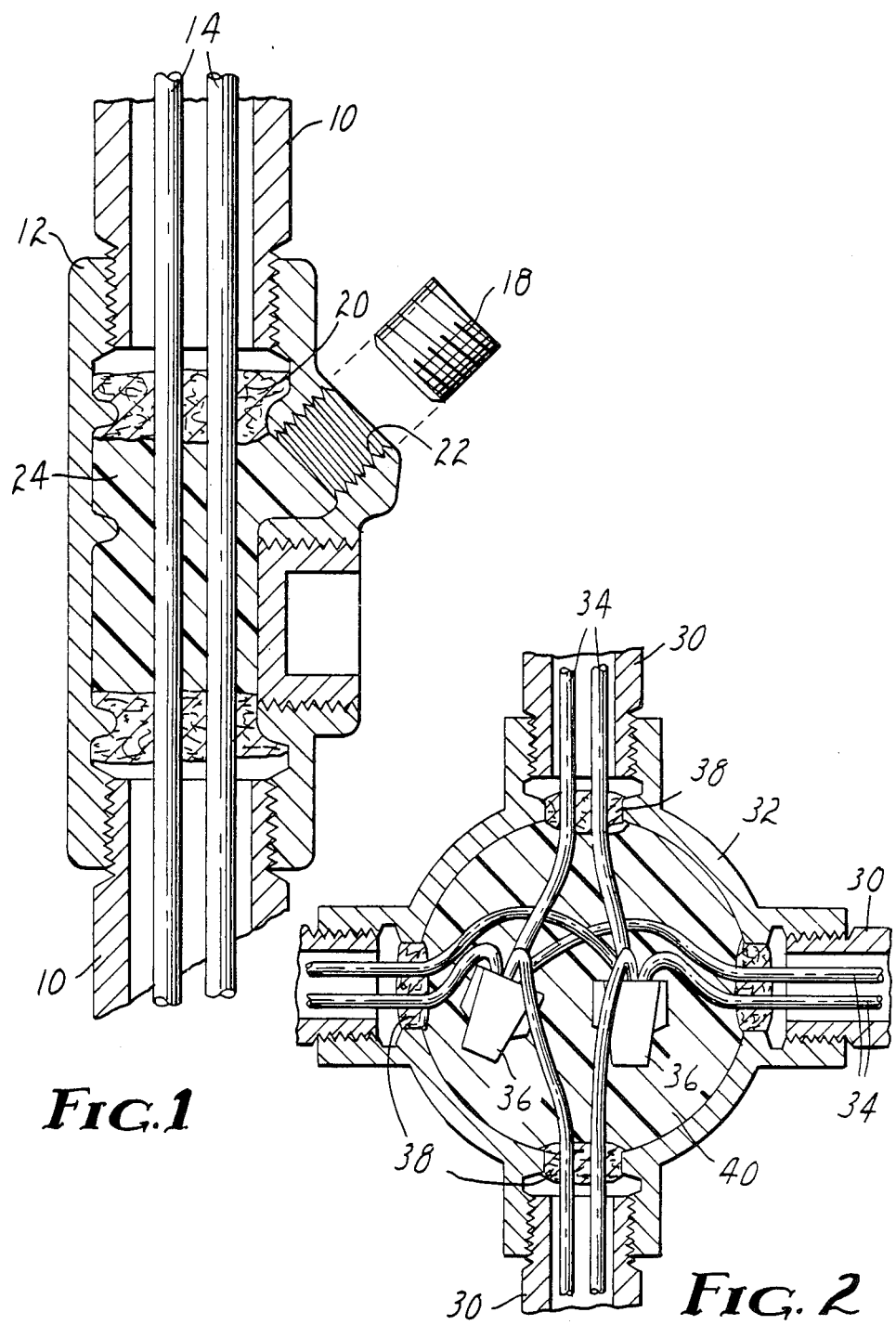

FOAM-SEALED ELECTRICAL DEVICES AND METHOD AND COMPOSITION THEREFOR

CROSS-REFERENCE TO RELATED APPLICATIONS

The present application is a continuation-in-part of application Ser. No. 650,051, filed Sept. 13, 1984 abandoned.

BACKGROUND OF THE INVENTION

1. Field of the Invention

The present invention relates to a method for sealing electrical fittings, such as junction boxes, electrical conduit, and the like, using a foamable resin composition.

2. Description of the Prior Art

The current National Electrical Code requires conduit seals to prevent passage of gases, vapors, or flames from one portion of an electrical installation to another through the conduit when used in areas where flammable or explosive gases and vapors may be present, such as Class 1, Group D, Division 1 or 2 installations. Present conduit seals are made of shatterable material, such as a mixture of litharge and glycerine, bitumen, or a coal tar and resin composition, such as disclosed in U.S. Pat. No. 3,902,006, or foam materials such as silicone rubber, as disclosed in U.S. Pat. No. 4,401,491 or siloxane foam disclosed in U.S. Pat. No. 4,259,455. Rewiring of electrical fittings which are sealed with shatterable material can be difficult, time consuming, and expensive. To rewire such fittings, it usually is necessary to smash the fitting and chip away the sealant, cut the wires, cut the conduit each side of the smashed fitting to permit removal of the fitting, install a new conduit fitting and conduit couplings, reconnect the wires and seal the fitting. Electrical fitting seals of material such as siloxane foam and silicone rubber can also be difficult to remove. U.S. Pat. No. 3,985,951 discloses the use of actinic radiation activated expandable foam for use in electrical connectors. U.S. Pat. No. 4,388,681 discloses a light fixture having a foam-filled ballast compartment.

SUMMARY OF THE INVENTION

The present invention relates to a method of sealing electrical fittings by foaming a removable, temperature resistant, flame retardant, solvent, gas, and vapor resistant, substantially closed cell isocyanurate foam in situ and to sealed electrical fittings containing such foam. The isocyanurate foam preferably is prepared from a two-part, liquid, foamable, curable composition having the parts stored in separate containers. The parts are mixed when the composition is to be applied and the mixture is placed in the electrical fitting and allowed to foam and cure in place. The cured isocyanurate foam provides an excellent seal in the electrical fitting which reduces the likelihood that gases, vapors, or flames will enter the fitting and pass from one portion of the electrical system to another. The cured isocyanurate foam also provides an excellent seal in telephone conduit systems, piping systems, etc., thus reducing the likelihood that liquids, vapors, or flames will enter the system or pass therethrough.

BRIEF DESCRIPTION OF THE DRAWING

FIG. 1 is a cross-sectional view of a conduit fitting sealed according to the invention.

FIG. 2 is a cross-sectional view of a junction box sealed according to the invention.

DETAILED DESCRIPTION OF THE INVENTION

Figure 3:
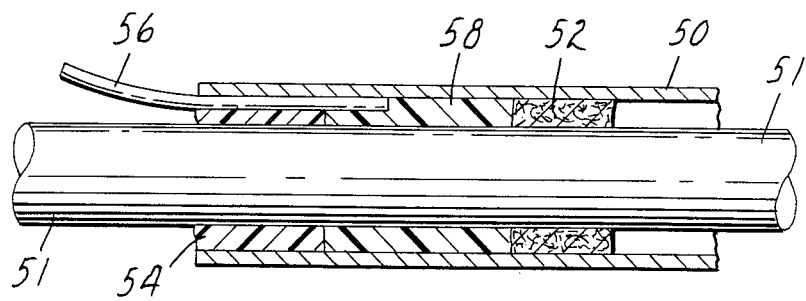
FIG. 3 is a cross-sectional view of a cable duct sealed according to the invention.

The cured isocyanurate foam of the present invention provides a seal against passage of most industrial gases or vapors through electrical fittings in which it is installed, is not affected by the surrounding atmosphere or liquids in most industrial settings, and has a melting point in excess of 100° C., usually above 175° C.

In a preferred method of the present invention, a two-part, liquid, foamable, curable, isocyanurate resin composition is mixed and poured into an electrical fitting, such as a conduit fitting or junction box, in sufficient quantity that the resin composition will fill the device upon foaming. The resin composition is allowed to foam, filling the fitting, and then allowed to cure, forming a substantially closed cell, easily removable, temperature resistant, flame retardant, gas and vapor resistant seal in the fitting. The cured foam is a rigid, non-rubbery, friable material which can easily be removed from the electrical fitting, using a tool such as a screwdriver or knife, without damage to the fitting or the wiring within the fitting.

The cured isocyanurate foam which forms the seal in the present invention is a substantially closed cell foam which resists passage of vapors when installed in an electrical fitting. The cured foam preferably has a compressive strength, as measured by ASTM Test Method D-1621, of about 200–400 psi (14 to 28 kg/cm$^2$) and a water absorbance capacity of less than about 6 percent, more preferably less than about 4 percent. The cream time and cure rate of the foam can be widely varied. Generally a cream time of about 2 to 10 minutes and a tack-free time of 5 to 20 minutes is preferred.

The cured foam preferably has a density of about 5–15 lb/ft$^3$ (80 to 240 kg/m$^3$), more preferably about 7–12 lb/ft$^3$ (110 to 200 kg/m$^3$). When the density of the cured foam is less than about 5 lb/ft$^3$ (80 kg/m$^3$), the foam generally has insufficient strength and tends to crumble. When the density of the cured foam is greater than about 15 lb/ft$^3$ (240 kg/m$^3$), the foam can be difficult to remove.

The density of the cured foam is dependent on the expansion of the foam in unconstrained foaming and the degree of overpacking caused by the constraint provided by the fitting being filled. As used herein, overpacking is the amount of resin composition used in excess of that needed to fill a cavity under free rise (unconstrained) conditions. A sufficient amount of resin composition should be used that the cavity is filled, but overpacking should not occur to the extent that the density of the cured foam exceeds about 15 lb/ft$^3$ (240 kg/m$^3$).

The cured foam of the present invention is flame retardant, i.e., self-extinguishing, and preferably has the following flammability characteristics when tested according to the test method of ASTM E-162-67:

(a) burn length of less than about 1 cm;
(b) extinguishing time of less than about 4 sec.;
(c) glow time of less than about 1 sec.; and
(d) no dripping.

The cured isocyanurate foam used in the present invention is solvent resistant, i.e., resistant to solvents found in the environment in which it is used. The term "solvent resistance" as used herein means that the cured isocyanurate foam, after 10 days submersion in a selected solvent such as hexane, ethyl acetate, cyclohexane, toluene, 1,2-dichloroethane, methanol, 2-propanol, petroleum naphtha, methyl ethyl ketone, and acetonitrile, exhibits no visible signs of degradation and retains at least about fifty percent, preferably about seventy-five percent, of the compressive strength before immersion in the solvent. In National Electric Code Class 1, Group D, Division 1 or 2 installations, resistance to the particular solvents present should be evaluated.

In the practice of a preferred embodiment of the method of the present invention, with reference to FIG. 1, an electrician installs conduit 10 and conduit fitting 12, and threads wires 14 through the conduit 10. The seal plug 18 is removed from the fitting and nonflammable packing material 20, such as glass wool, ceramic wool, etc., is inserted in the fitting to prevent flow of resin beyond the area which is to be sealed. In vertical fittings, installation of packing material 20 only at the lower portion of the fitting to be sealed generally suffices. The isocyanurate resin composition is then mixed (if in two parts) and poured into the fitting 12 through a suitable opening such as orifice 22 in sufficient amount to fill the void space in the fitting after foaming and to achieve a cured foam density of 5 to 15 lb/ft$^3$ (80 to 240 kg/m$^3$). The resin composition is preferably not brought in contact with the threads of the fitting or plug as the adhesive properties of the cured resin may cause difficulty in later plug removal. The seal plug 18 is replaced and the resin composition is permitted to foam and cure. Generally, a fully cured foam is obtained in about 2 to 24 hours depending on the resin composition and ambient conditions. The cured foam 24 may then be inspected.

Other electrical fittings such as junction boxes can be similarly sealed as shown in FIG. 2. The conduit 30 and junction box 32 are installed and wiring 34 is threaded through the conduit 30 into junction box 32. Electrical connections 36 are made and packing material 38 is inserted in the junction box at points where conduit is connected to prevent flow of resin into the conduit. The isocyanurate resin composition is then mixed (if in two parts) and poured into the junction box in sufficient amount to fill the junction box after foaming and to achieve a cured foam density of 5 to 15 lb/ft$^3$ (80 to 240 kg/m$^3$) The junction box cover (not shown) is then secured to the junction box and the resin composition is permitted to foam and cure. The cured foam 40 may then be inspected, if desired, by removal of the cover.

When rewiring is necessary, the foam sealant material can be easily removed. The seal plug of the conduit fitting or the cover of the junction box is removed and the sealant material is fragmented to an extent sufficient to expose the wiring using a tool such as a screwdriver or knife. The fragmented sealant material is then brushed, vacuumed or otherwise removed from the fitting and the packing material is removed. Wiring can then be repaired, rerouted, or otherwise modified as desired. After the wiring modifications are complete, the fitting may again be sealed using the method of the invention as described above.

In another preferred embodiment of the invention, shown in FIG. 3, the isocyanurate resin composition is used to seal cable duct 50. Packing material 52 which may be in the form of a web strip (shown), flexible foam sheet, rags, cardboard template, etc. is placed around the cable 51 within the duct 50 several inches from the end of the duct to form a first barrier. A second piece of packing material 54 is placed around the cable 51 at the end of the duct to form a second barrier spaced from the first barrier. In risers, i.e., vertical ducts, installation of packing material 54 only at the lower portion of the riser to be sealed generally suffices. As used herein, the term duct is used to refer to both horizontal installations, commonly called "ducts" and vertical installations commonly called "risers". A tube 56 is temporarily inserted between packing material 54 and duct 50 such that one end of the tube is within the space formed by packing materials 52 and 54 and the other end protrudes from the duct. Resin composition is mixed and fed into the space between packing materials 52 and 54 through tube 56 in sufficient quantity to fill the space upon foaming and to provide a seal 58 having a cured foam density of 5 to 15 lb/ft$^3$ (80 to 240 kg/m$^3$). Tube 56 is removed after insertion of the resin composition.

When rewiring of the cable is necessary, the foam sealant can be easily removed. The end of the duct is exposed, packing material 54 is removed, the foam sealant is fragmented using a tool such as a knife or screwdriver and removed and then packing material 52 is removed. The cable can then be changed and the duct can be resealed.

Isocyanurate resin compositions useful in the present invention preferably are of the type disclosed and described in U.S. Pat. Nos. 3,635,848 and 3,697,485, the disclosures of which are incorporated herein by reference. The isocyanurate resins used in the present invention are preferably provided as a two-part composition which is mixed at the time of application. Part A of the composition is a prereaction product of an isocyanate reactant material and a polyol. Part A may also contain a low molecular weight diol. Part B of the composition is a mixture of catalysts useful in effecting polymerization or cure of the polyisocyanate-polyol reaction mixture to form the isocyanurate resin, fire retardant fillers, and other additives such as water to cause foaming, foam stabilizers, chain extending agents, cocatalysts, and coreactants which affect molecular weight, flexibility, cross-link density, and compressive strength of the cured foam.

The isocyanate reactant materials which can be trimerized to make isocyanurates are known in the prior art (e.g., see U.S. Pat. No. 3,054,755) and can be represented by the general formula $R(NCO)_n$ where R is aryl, alkyl, or cycloalkyl, and n is 1 to 5. Preferred isocyanates are the aromatic isocyanates. Representative mono-isocyanates which can be trimerized to form isocyanurate compounds include phenyl isocyanate, benzyl isocyanate, p-tolyl isocyanate, 1-naphthyl isocyanate, n-propyl benzyl isocyanate, o-tolyl isocyanate, p-methoxyphenyl isocyanate, o-chlorophenyl isocyanate, p-nitrophenyl isocyanate, and p-phenylmethylene phenyl isocyanate. Polyisocyanates can also be polymerized or trimerized to form crosslinked polyisocyanurates, such polyisocyanates being trimerized per se with a catalyst or in admixture with a polyol. Representative polyisocyanates which can be used are aromatic polyisocyanates such as toluene diisocyanate, diphenylmethane diisocyanate and xylene diisocyanate. 4,4'-diphenyl methane diisocyanate is particularly preferred in that it is readily reactive with the preferred polyols to give products having the desired properties, and is economically available commercially. Other suitable diisocyanates include m- or p-phenylene diisocyanate, 1,5-naphthalene diisocyanate, hexamethylene diisocyanate, 3,3'-dimethyl-4,4'-biphenylene diisocyanate, and dimer acid diisocyanates. Other useful polyisocyanates include polyisocyanate compositions obtained by phosgenating the polyamines obtained by condensing formaldehyde with aromatic amines. Examples of polyisocyanates thus produced are the polymethylene polyphenyl isocyanates. A list of useful commercially available polyisocyanates is found in "Encyclopedia of Chemical Technology," Kirk-Othmer, 2nd Ed., Vol. 12, pp. 46–47, Interscience Pub., N.Y. (1967).

NCO-capped prepolymers can also be trimerized with catalysts to produce urethane-modified polyisocyanurates. Such prepolymers can also be used in admixture with polyols and the mixture catalyzed to produce products with urethane and isocyanurate linkages. Such NCO-capped prepolymers are well known (see U.S. Pat. Nos. 3,073,802 and 3,054,755) and are generally prepared by reacting an excess of polyisocyanates, such as an aromatic diisocyanate, with polyalkylene ether glycols, or polyester glycols. Suitable NCO-capped prepolymers are sold under the trademarks "Multrathane" and "Adiprene". The isocyanate can also be used in the form of a blocked isocyanate.

The polyol component of the polyisocyanate polyol reaction mixture is preferably a low molecular weight polyalkylene ether polyol, but can also be a low molecular weight nonpolymeric polyol, or a polyester or polyester amide containing reactive hydroxyl groups. Preferred polyols have a number average molecular weight between about 250 and 2,000. To achieve a readily removable, friable foam, the polyol preferably should have an average polyol or hydroxyl equivalent weight between about 130 and 400 (i.e., one active —OH group per 130 to 400 molecular weight of polymer) and a crosslink density of about 1 crosslink per 400 to 2,000 atomic weight units.

Examples of preferred polyether polyols are polypropylene ether polyols or polybutylene ether polyols, such as the glycols represented by the formula HO(-RO)$_n$H. Especially preferred polyalkylene ether polyols are condensates of ethylene, propylene, or butylene oxide with pentaerythritol, sorbitol, sucrose, methyl-glucosides, or low molecular weight polyols, such as propylene glycol, tri-, tetra-, penta-, or hexa-methylene glycols, 1,3-butylene glycol, 1,3-(2 ethyl) hexanediol, 2,2,4-trimethyl-1,3-pentanediol, trimethylol propane, 1,2,6-hexanetriol, or phenyldiisopropanolamine. The low molecular weight polyols mentioned above can also be used, and preferably blended, with polymeric polyols as components in the reaction mixture.

Useful polyesters include castor oil, derivatives thereof, and those polyesters generally prepared by the esterification reaction of an organic dicarboxylic acid or anhydride with an alkylene oxide polyol. Preferred alkylene oxide polyols are ethylene, propylene, and butylene oxide polyester polyols having two or more hydroxyl groups per molecule. The acid or anhydride may be selected from a wide variety of polybasic acids, such as malonic, succinic, glutaric, adipic, pimelic, sebacic, acids prepared by dimerization or trimerization of unsaturated 18 carbon fatty acids and others. The reactants are combined in molecular ratios to provide hydroxyl terminating groups on the polyester molecules. In the formation of these polyesters, it is quite common to provide mixtures of acids and anhydrides with mixtures of glycols and other polyols. The acid number may be controlled by methods known in the art, and is usually less than 5.

The prereaction product of the isocyanate reactant material and the polyol can be prepared by heating the isocyanate reactant material and the polyol together for a period of time, e.g., one to six hours, as is well known in the art. Catalysts may be employed in the preparation of the prepolymer. Suitable catalysts include tertiary amines, such as dimethylcyclohexyl amines, triethylamine, 1,2,4-trimethylpiperazine or heavy metal compounds soluble in the reaction system such as iron-acetoacetate and dibutyltin dilaurate and mixtures thereof.

Generally, in the curing of the foamed material, the polyol-polyisocyanate reaction mixture cured with the catalyst of this invention can have NCO/OH equivalent ratios in the range of 1/1 to 12/1, and even higher, e.g., 20/1 to 40/1, preferably at least 1.2/1 since below the latter ratio the product will contain unreacted or free hydroxyl groups (which have a plasticizing function) and may be too flexible. Products made from reaction mixtures having NCO/OH ratios of 1/1 to 1.2/1 can be characterized as isocyanurate-modified polyurethanes, the isocyanurate content generally being at least 1.0 wt. percent of the product. Those products made from reaction mixtures with NCO/OH ratios of 1.2/1 and greater, e.g., 3/1 to 12/1, can be characterized as urethane-modified polyisocyanurates, the isocyanurate content being generally at least 5.0 weight percent of the product. The preferred products are those which are highly crosslinked by reason of having about 20 to 80 percent of the —NCO groups of the polyisocyanate reactant converted into isocyanurate linkages. In general, regardless of the NCO/OH ratio, the polyisocyanurate resins used in this invention preferably have sufficient isocyanurate linkages in the polymer backbone to provide a heat stable product, e.g., a product which retains 75 to 100 percent of its room temperature hardness when heated at elevated temperature, e.g., 1 hour at 150° to 250° F.

Catalysts useful in the isocyanurate resin composition are those catalysts which promote room temperature curing of the applied mixed resin composition. Useful catalysts include various trimerization catalysts disclosed in Polyurethane Chemistry; Technology, Part 1, J. H. Saunders et al., Interscience Publications, N.Y., 1962, p. 94, U.S. Pat. Nos. 2,979,485, 2,993,870, and 3,381,008. Useful catalysts also include alkoxyborates, xanthates, polyvalent metal compounds, tertiary amines and tertiary amine alcohols. A preferred combination of catalysts include tetraalkoxyborate catalysts (see U.S. Pat. No. 3,635,848) and certain compounds of polyvalent metals, such as tin, lead or mercury.

The amount of catalyst used in polymerizing the isocyanate-polyol reaction mixture will vary, depending on the particular catalyst used, the ingredients in the mixture, and the desired rate of cure. Functionally stated, the amount of catalyst used will be that amount sufficient to catalyze the polymerization or trimerization of the reaction mixture under the conditions in which the mixture is applied. Further, the type and amount of catalyst are selected to provide a cream time for the reaction mixture of at least about 90 seconds, preferably about five to ten minutes, to permit mixing and application of the material to the site to be sealed. As a general guide, the amount of catalyst will be less than 10 weight percent of the isocyanate-polyol prereaction product, and preferably from 0.5 to 5 weight percent of the prereaction product.

Fire retardant agents can be utilized in the isocyanurate resin composition to enhance fire resistance of the composition. Suitable fire retardant agents include polyvinyl chloride, antimony compounds such as antimony trioxide, and phosphorous compounds such as phosphates, e.g., tricresyl phosphate, phosphites, phosphorates and compounds disclosed in U.S. Pat. Nos. 3,257,337 and 3,245,922. Functionally stated, the amount of fire retardant agent used will be that amount sufficient to provide the desired flammability resistance for the intended application. As a general guide, the amount of fire retardant agent typically will be from about 5 to 10 weight percent of the isocyanate-polyol prereaction product, and preferably from about 5 to 6 weight percent of the prereaction product.

Blowing agents are added to form the foam from the isocyanurate resin composition, the amount of blowing agent used controlling the foam density. Any of the known blowing agents such as water, freon, acetone, and methylene chloride may be used. Water is the preferred blowing agent due to its low cost and the excellent density control which can be achieved. The density of the isocyanurate foam preferably is sufficient to maintain the electrical fitting vapor resistant and gas resistant while permitting easy removal of the sealant from the fitting when rewiring is to be done. To achieve the desired density, the amount of water used preferably should be about 0.25 to 0.60 weight percent, more preferably 0.35 to 0.45 weight percent of the isocyanate-polyol prereaction product.

Chain extending or crosslinking agents may be added to Part B of the composition to achieve the desired crosslink density of the cured foam. Chain extending or crosslinking agents, such as polyols and polycarboxylic acid, are useful in causing the cured product to be chain extended and highly crosslinked. Polyether polyols are preferred crosslinking agents. Examples of commercially available polyether polyols include "Pluracol" TP-440, "Pluracol" TP-740, and "Pluracol" PEP 550 (BASF Chemical Company), "Voranol" 370, "Voranol" 490, and "Voranol" 800 (Dow Chemical Company), "Multranol" 4030 and "Multranol" 4050 (Mobay Chemical Company), and "Niax" LF 490, "Niax" LHT 240, and "Niax" PCP 0301 (Union Carbide Corp.). The amount of chain extending agent used will vary depending on the particular chain extending or crosslinking agents selected. Functionally stated, the amount of chain extending or crosslinking agent will be that amount sufficient to provide the desired crosslink density in the cured foam. As a general rule, the amount of chain extending or crosslinking agent preferably will be in the range of about 10 to 30 weight percent, more preferably from about 14 to 20 weight percent, of the isocyanate-polyol prereaction product.

Hardness modifying agents can also be included in Part B of the composition. Such hardness modifying agents include diamines such as diethanol amine, dibutanol amine, di-n-propylamine, and di-n-butylamine, mono-isocyanates, such as phenyl isocyanate, benzyl isocyanate, and p-tolyl isocyanate, and alcohols such as 1,4-butane diol, trimethylol propane, "Butyl Cellosolve", available from Union Carbide Co., "Butyl Carbitol", also available from Union Carbide Co., oleyl alcohol, etc. The amount of hardness modifying agent used preferably will be in the range of about 0.1 to 5.0 weight percent of the isocyanate-polyol prereaction product and more preferably from about 0.15 to 4.0 weight percent of the prereaction product.

Conventional foam stabilizing agents such as silicone oils, organo-silicones such as polydialkylsiloxanes and polyoxyalkylene/siloxane copolymers, perfluoroalkylamines such as disclosed in U.S. Pat. No. 3,378,399, e.g., N-butyl perfluorooctanesulfonamidoethylamine, and perfluoroalkylalcohols such as disclosed in U.S. Pat. No. 3,880,782, e.g., N-butyl perfluorooctanesulfonamidoethylalcohol, can also be incorporated into the reaction mixture to improve porosity control of the foamed product. The amount of foam stabilizing agent used is preferably in a range of 0.1 to 5.0 weight percent of the isocyanate-polyol prereaction product and more preferably from about 0.13 to 0.30 weight percent of the prereaction product.

Glass bubbles may also be advantageously incorporated into the reaction mixture to increase friability of the cured foam. The glass bubbles preferably have a density of 0.15 to 0.30 g/cc. Glass bubbles may preferably be added in amounts of 10 to 12 weight percent, but can be added in amounts as great as 40 weight percent.

Objects and advantages of this invention are further illustrated by the following examples. In the following examples, all parts are by weight unless otherwise indicated.

EXAMPLE 1

Part A of the resin composition was prepared by adding 500 parts 4,4'-diphenylmethane diisocyanate to a flask equipped with a stirrer, heater, and reflux condenser maintained under nitrogen atmosphere. 83.9 parts Niax 2025, a polypropylene glycol available from Union Carbide Co. having a molecular weight of about 2000, were then added to the flask with stirring. To this mixture was gradually added 76.6 parts tripropylene glycol having a molecular weight of 200. The resulting mixture was heated to 64° C. with continued stirring. As the mixture began to exotherm, the reaction was allowed to progress and the flask was cooled as needed to prevent the temperature of the mixture from exceeding 80° C. After one-half hour, the temperature was adjusted to 64° C. and thus maintained for one hour. The resulting polyol-polyisocyanate reaction mixture was allowed to cool to ambient conditions and was ready for use.

Part B of the resin composition was prepared by mixing the following ingredients.

| Ingredients | Parts |
| --- | --- |
| Pluracol TP-440 | 20.0 |
| Trimethylol propane | 6.70 |
| Polyvinyl chloride | 5.69 |
| Antimony trioxide | 5.07 |
| Lead octoate | 0.0034 |
| N—butyl perfluoro-octanesulfon-amidoethyl alcohol | 0.226 |
| Potassium borate ester* | 0.226 |
| Dimethyl ethanol amine | 0.045 |
| Water | 0.45 |

*potassium borate ester was prepared by reacting triethylene glycol, boric acid and potassium hydroxide in a ratio of 6.75:4.65:5.20 and removing water by vacuum Four parts of Part A were mixed with 1 part of Part B. The cream time was 5 to 10 minutes and the tack-free time was 15 to 20 minutes. The properties of the cured foam are shown in Table 2.

Samples of the cured foam, 2.5 cm×2.5 cm×2.5 cm, were immersed in various solvents for a period of ten days at 22° C. to determine solvent resistance. The solvents included cyclohexane, methanol, ethyl acetate, hexane, methyl ethyl ketone, 1,2-dichloroethane, toluene, 2-propanol, petroleum naphtha, and acetonitrile.

After removal from the solvent, the samples were tested for swelling as measured by volume expansion and solvent absorption. The results are shown in Table 1. By visual inspection, none of the samples showed evidence of degradation. After allowing the samples to dry at room temperature, the compressive strength of each sample together with an untreated control sample was measured using ASTM Test Method D-1621.

TABLE 1

| Solvent | Volume Expansion (%) | Solvent Absorption (wt. %) | Compressive Strength (kg/cm$^2$) |
| --- | --- | --- | --- |
| Control | — | — | 19 |
| Hexane | 0 | 0 | 19 |
| Ethyl acetate | 9 | 20 | 21 |
| Cyclohexane | 0 | 10 | 21 |
| Toluene | 0 | 0 | 19 |
| 1,2-Dichloroethane | 19 | 3 | 15 |
| Methanol | 12 | 12 | 19 |
| 2-Propanol | 0 | 4 | 25 |
| Petroleum naphtha | 0 | 0 | 21 |
| Methyl ethyl ketone | 21 | 18 | 21 |
| Acetonitrile | 0 | 0 | 18 |

As can be seen from the data in Table 1, the foam exhibited excellent solvent resistance to the solvents in which it was immersed, with none of the solvents causing any significant degradation. Swelling of the samples was low, 1,2-dichloroethane and methyl ethyl ketone causing the greatest swelling, 19% and 21% volume expansion respectively. Solvent absorption was low, the greatest absorption occurring with methyl ethyl ketone and ethyl acetate, 18% and 20%, respectively. The compressive strength of the samples was not significantly reduced, the greatest reduction in compressive strength occurring with 1,2-dichloroethane where the sample retained a compressive strength of 15 kg/cm$^2$.

EXAMPLE 2

Three strands of No. 14 wire were pulled through an "XYB 3" conduit seal fitting, (center and upper access plug) manufactured by the Adalet Division of Seatl Fitzer Co., having about 10" of conduit attached at each hub of the fitting. The access caps were removed from the fitting and "Chico X" fiber, available from Crouse-Hinds Co., was packed in the openings in the hubs of each end of the fitting. The fitting was placed in a vertical position and the center access plug was replaced.

The resin composition of Example 1 was provided in a three compartment, flexible, disposable pack, the first compartment containing 100 g of Part A, the second compartment containing 25 g of Part B, and the third compartment being provided with an applicator nozzle. The partition between the first and second compartments was ruptured and Parts A and B of the resin composition were mixed by squeezing the pack by hand for about 30 seconds. The partition between the second and third compartments was then ruptured and sufficient resin composition was discharged from the pack through the upper access opening of the fitting to fill the fitting cavity about one-third full. The upper access plug was replaced and the resin composition was allowed to foam and cure. After 20 hours, the access plugs were removed. Visual observation showed the fitting cavity to be filled and sealed with cured foam. The cured foam was friable and was easily removed by use of a screwdriver. The packing fiber was also removed. The wiring was easily pulled from the fitting through the conduit. The fitting was rewired and again sealed using the procedure set forth above.

EXAMPLE 3

One No. 12 wire and two No. 14 wires were pulled through an "EYS 2" conduit seal fitting (single access plug), manufactured by Crouse-Hinds Co., having about 10" of conduit attached at each hub of the fitting. The fitting was sealed as in Example 2 using the resin composition of Example 1. After curing, the access plug was removed. The cured resin was friable and easily removed from the fitting with a screwdriver so that rewiring could be done.

EXAMPLE 4

Three strands of No. 12 wire were pulled through a "GUAT 16" junction box having a "GUA 062" cover, manufactured by Crouse-Hinds Co.. The cover was removed from the box and the hubs were packed with fiber. The junction box, lying flat, was then filled about one-third full of the resin composition of Example 1. The cover was replaced and the resin was allowed to foam and cure. The cover was removed after about four hours. The surface of the foam was cured, but the interior portions of the foam were not fully cured during this period of time. Although the partially cured foam was not readily friable as in Examples 2 and 3, the foam was removed from the box using a screwdriver so that the box could be rewired.

EXAMPLE 5

Part A was prepared in the same manner as in Example 1. Part B was prepared by mixing the following ingredients:

| | |
| --- | --- |
| Pluracol TP 440 | 7.12 |
| Pluracol TP 740 | 7.12 |
| Polyvinyl chloride | 5.69 |
| Antimony trioxide | 5.07 |
| Potassium borate ester | 1.00 |
| Lead octoate | 0.015 |
| N—butyl perfluorooctane sulfonamidoethyl amine | 0.50 |
| Dimethyl ethanol amine | 0.30 |
| Water | 0.45 |

Six parts of Part A were mixed with 1 part of Part B to form the isocyanurate foam. The cream time was 2 minutes and the tack-free time was 5–10 minutes. When cured, this mixture formed a friable foam that could readily be removed from electrical fixtures. The properties of the cured foam are shown in Table 2.

EXAMPLE 6

Part A was prepared by mixing 10 parts of the composition of Part A of Example 1 and 1 part of glass bubbles (500 angstroms diameter; 0.23 g/cc). Part B was prepared by adding 5 parts of similar glass bubbles to Part B of Example 5. 5 parts of Part A were mixed with 1 part of Part B. The cream time was 2 minutes and the tack-free time was 5–8 minutes. This foam was very friable and when cured could be removed from an electrical fitting even more readily than the foam compositions of Examples 1 and 2. The properties of the cured foam are shown in Table 2.

In Table 2 below the following test methods were used to determine the properties. The density, compressive strength, and water absorption were determined using ASTM Test Methods D-1622, D-1621, and D-2127, respectively. The dimensional stability was determined by heating a 7.6 cm (3 in.) wide, 30.5 cm (12 in.) long, 1.27 cm (0.5 in.) thick sample at 121° C. (250° F.) for two hours under vacuum of 50.8 cm (20 in.) Hg, cooling to 48.8° C. (120° F.), and measuring the change in thickness. Flammability was determined using ASTM Test Method E-162-67.

TABLE 2

|  | Example 1 | Example 5 | Example 6 |
|---|---|---|---|
| Density (kg/m$^3$) | 160 | 160 | 160 |
| Compressive strength (kg/cm$^2$) | 17.4–24.4 | 13.9–17.4 | 17.4–24.4 |
| Water absorption (%) | 4 | 4 | 4 |
| Dimensional stability (%) | 0.24 | 0.24 | 0.24 |
| Flammability |  |  |  |
| Burn length (cm) | 1 | 1 | 1 |
| Extinguishing time (sec) | 4 | 4.5 | 4.5 |
| Glow time (sec) | 1 | 1 | 1 |
| Dripping | none | none | none |

EXAMPLES 7–9

Resin compositions were prepared as in Example 1 except that the amount of water in Part B was 0.5 g (Example 7) 0.8 g (Example 8) and 1.25 g (Example 9) to provide foams having varying densities. Various amounts of each resin composition were placed in 140 ml closed containers and allowed to foam and cure. The amount of overpacking for each sample was calculated and the density was measured. The results are shown in Table 3 and in FIG. 4 where X represents Example 7, Y represents Example 8, and Z represents Example 9.

TABLE 3

| Example | Amount of Resin Composition (g) | Overpacking (%) | Density (lb/ft$^3$) |
|---|---|---|---|
| 7A | 10$^a$ | 0 | 9.5$^c$ |
| 7B | 21$^b$ | 0 | 9.5 |
| 7C | 25 | 18 | 11.8 |
| 7D | 40 | 88 | 17.6 |
| 7E | 50 | 136 | 20.1 |
| 7F | 60 | 183 | 24.7 |
| 7G | 80 | 277 | 32.2 |
| 8A | 10$^a$ | 0 | 7.6$^c$ |
| 8B | 17$^b$ | 0 | 7.6 |
| 8C | 40 | 140 | 15.0 |
| 8D | 50 | 200 | 17.0 |
| 8E | 60 | 260 | 22.0 |
| 9A | 10$^a$ | 0 | 5.8$^c$ |
| 9B | 13$^b$ | 0 | 5.8 |
| 9C | 25 | 96 | 7.9 |
| 9D | 40 | 214 | 12.5 |

Figure 4:
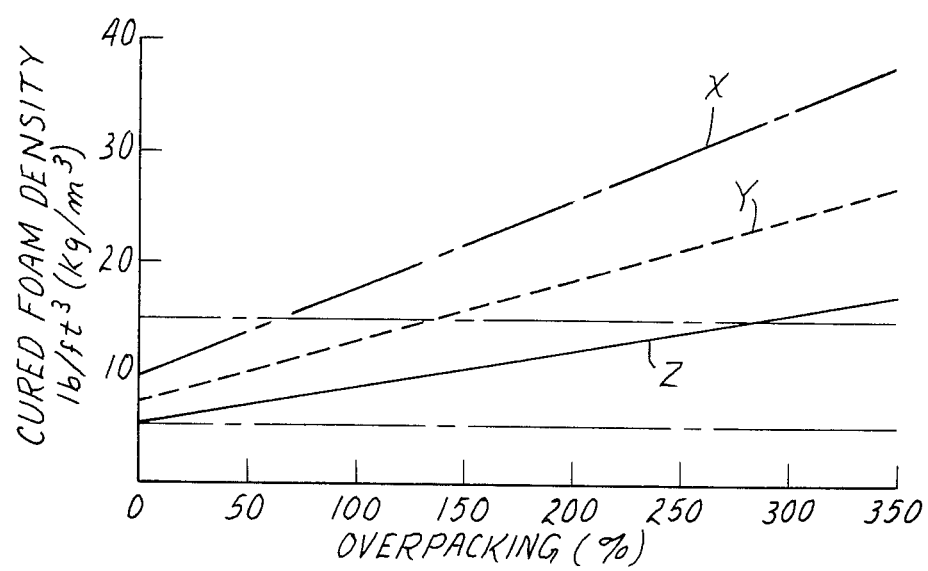
FIG. 4 is a graph showing the cured foam density in a device sealed according to the invention as related to overpacking of the foam in the device.

$^a$insufficient resin composition to fill container after foaming
$^b$amount of resin composition was just adequate to fill container after foaming
$^c$free rise density As can be seen from the data in Table 3 and FIG. 4, the cured foam density is related to the free-rise foam density and the amount of overpacking of the foam in the container. To achieve a cured foam density of less than 15 lb/ft$^3$ (80 to 240 kg/m$^3$), as shown in FIG. 4, the maximum density at which the foam is friable and easily removed, overpacking for foam having the above-specified free-rise densities should not exceed those set forth in Table 4. To achieve the preferred cured foam density of 7 to 12 lb/ft$^3$ (110–200 kg/m$^3$, overpacking for foam having the above-specified free-rise densities is also set forth in Table 4.

TABLE 4

| Free-rise foam density | Maximum overpacking (%) | Overpacking (%) (Preferred density) |
|---|---|---|
| 9.5 | 65 | 0–30 |
| 7.6 | 140 | 0–75 |
| 5.8 | 270 | 50–195 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of sealing electrical fittings or cable duct comprising placing in the hollow portion of the fitting or duct to be sealed a foamable mixture of (a) a prereaction product of excess organic polyisocyanate and polyol and (b) a mixture of trimerizing catalyst capable of providing a cream time of at least about 90 seconds, chanin extenting against flame retardant agent, and blowing agent, and allowing the mixture of (a) and (b) to foam and cure in situ to form a removable, friable, flame retardant, solvent resistant, substantially closed cell isocyanurate foam having a density of about 80 to 240 kg/m$^3$.

2. The method of claim 1 wherein said foam has a density of about 110 to 200 kg/m$^3$.

3. The method of claim 1 wherein said foam has the following flammability characteristics:
   (a) burn length of less than about 1 cm;
   (b) extinguishing time of less than about 4 sec;
   (c) glow time of less than about 1 sec; and
   (d) no dripping.

4. The method of claim 1 wherein said prereaction product has an NCO/OH equivalent ratio in the range of about 1/1 to 40/1.

5. The method of claim 1 wherein said prereaction product has an NCO/OH equivalent ratio in the range of about 1.2/1 to 12/1.

6. The method of claim 1 wherein the amount of said catalyst is about 0.5 to 5 weight percent based on the weight of said prereaction product.

7. The method of claim 1 wherein the amount of said chain extending agent is about 10 to 30 weight percent based on the weight of said prereaction product.

8. The method of claim 1 wherein the amount of said flame retardant agent is about 5 to 10 weight percent based on the weight of said prereaction product.

9. The method of claim 1 wherein said blowing agent is water.

10. The method of claim, 9 wherein the amount of said water is about 0.25 to 0.60 weight percent based on the weight of said prereaction product.

11. A sealed electrical fitting comprising an electrical fitting filled with a removable friable, flame retardant, solvent resistant, substantially closed cell isocyanurate foam having a density of about 80 to 240 kg/m$^3$, said isocyanurate foam being prepared from a two-part, liquid, foamable, curable composition comprising a mixture of:
   (a) in a first part, a prereaction product of excess isocyanate reactant material and polyol, and
   (b) in a second part, catalyst, chain extending agent, fire retardant and water.

12. The sealed electrical fitting of claim 11 wherein said foam has a density of about 110 to 200 kg/m$^3$.

13. A sealed electrical fitting according to claim 11 wherein said foam has a compressive strength of about 14 to 28 kg/cm$^2$.

14. A sealed electrical fitting according to claim 11 wherein said foam has a water absorbance capacity of less than about 6%.

15. A sealed electrical fitting according to claim 11 wherein said foam has the following flammability characteristics:
   (a) burn length of less than about 1 cm;
   (b) extinguishing time of less than about 4 sec;
   (c) glow time of less than about 1 sec; and
   (d) no dripping.

16. The sealed electrical fitting of claim 11 wherein said prereaction product has an NCO/OH equivalent ratio in the range of about 1/1 to 40/1.

17. The sealed electrical of claim 11 wherein said prereaction product has an NCO/OH equivalent ratio in the range of about 1.2/1 to 12/1.

18. The sealed electrical fitting of claim 11 wherein the amount of said catalyst is about 0.5 to 5 weight percent based on the weight of said prereaction product.

19. The sealed electrical fitting of claim 11 wherein the amount of said chain extending agent is about 10 to 30 weight percent based on the weight of said prereaction product.

20. The sealed electrical fitting of claim 11 wherein the amount of said flame retardant agent is about 5 to 10 weight percent based on the weight of said prereaction product.

21. The sealed electrical fitting of claim 11 wherein the amount of said water is about 0.25 to 0.60 weight percent based on the weight of said prereaction product.

22. Sealed cable duct comprising cable duct having cable therethrough sealed with a removable friable, flame retardant, solvent resistant, substantially closed cell isocyanurate foam having a density of about 80 to 240 kg/cm$^3$, said isocyanurate foam being prepared from a two-part, liquid, foamable, curable composition comprising a mixture of:
   (a) in a first part, a prereaction product of excess isocyanate reactant material and a polyol, and
   (b) in a second part, catalyst, chain extending agent, fire retardant and water.

23. Sealed cable duct according to claim 22 where foam has a density of about 110 to 20 kg/m$^3$.

24. Sealed cable duct according to claim 22 wherein said foam has the following flammability characteristics:
   (a) burn length of less than about 1 cm;
   (b) extinguishing time of less than about 4 sec;
   (c) glow time of less than about 1 sec; and
   (d) no dripping.

* * * * *

UNITED STATES PATENT AND TRADEMARK OFFICE
CERTIFICATE OF CORRECTION

PATENT NO. : 4,640,978

DATED : February 3, 1987

INVENTOR(S) : Kilbane et al.

It is certified that error appears in the above-identified patent and that said Letters Patent is hereby corrected as shown below:

Col. 12, line 22, "chanin extending against" should be -- chain extending agent, -- .

Col. 14, line 20, "where" should be -- wherein said -- .

Col. 14, line 21, "20" should be -- 200 -- .

Signed and Sealed this

Second Day of February, 1988

Attest:

DONALD J. QUIGG

Attesting Officer

Commissioner of Patents and Trademarks